July 27, 1965   D. E. WURSTER ETAL   3,196,827
APPARATUS FOR THE ENCAPSULATION OF DISCRETE PARTICLES
Filed Nov. 19, 1962   2 Sheets-Sheet 2
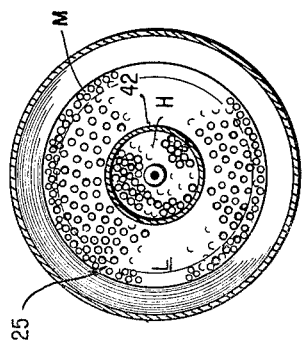
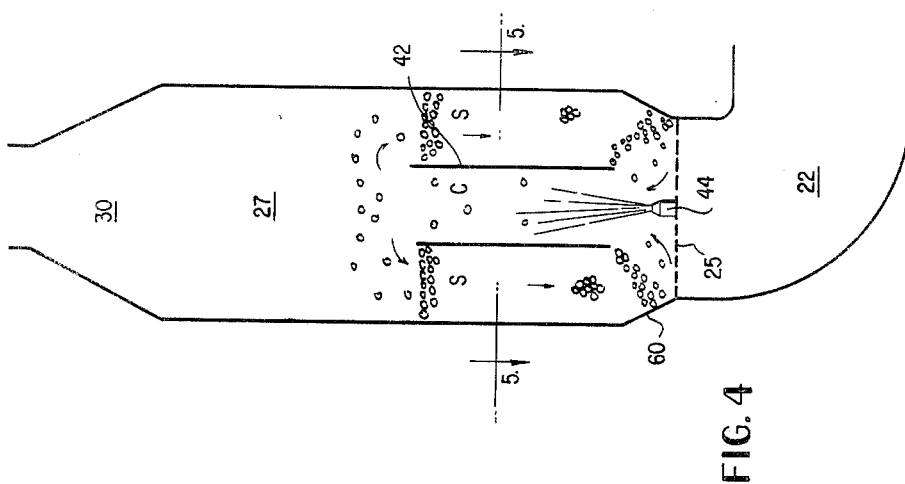
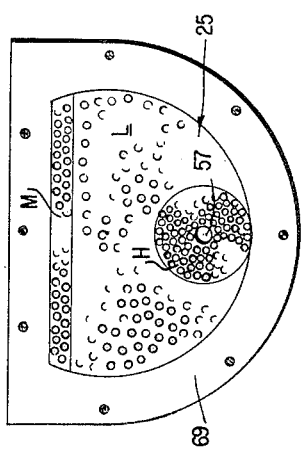
INVENTORS.
DALE E. WURSTER
JAMES A. LINDLOF
BY
ATTORNEYS

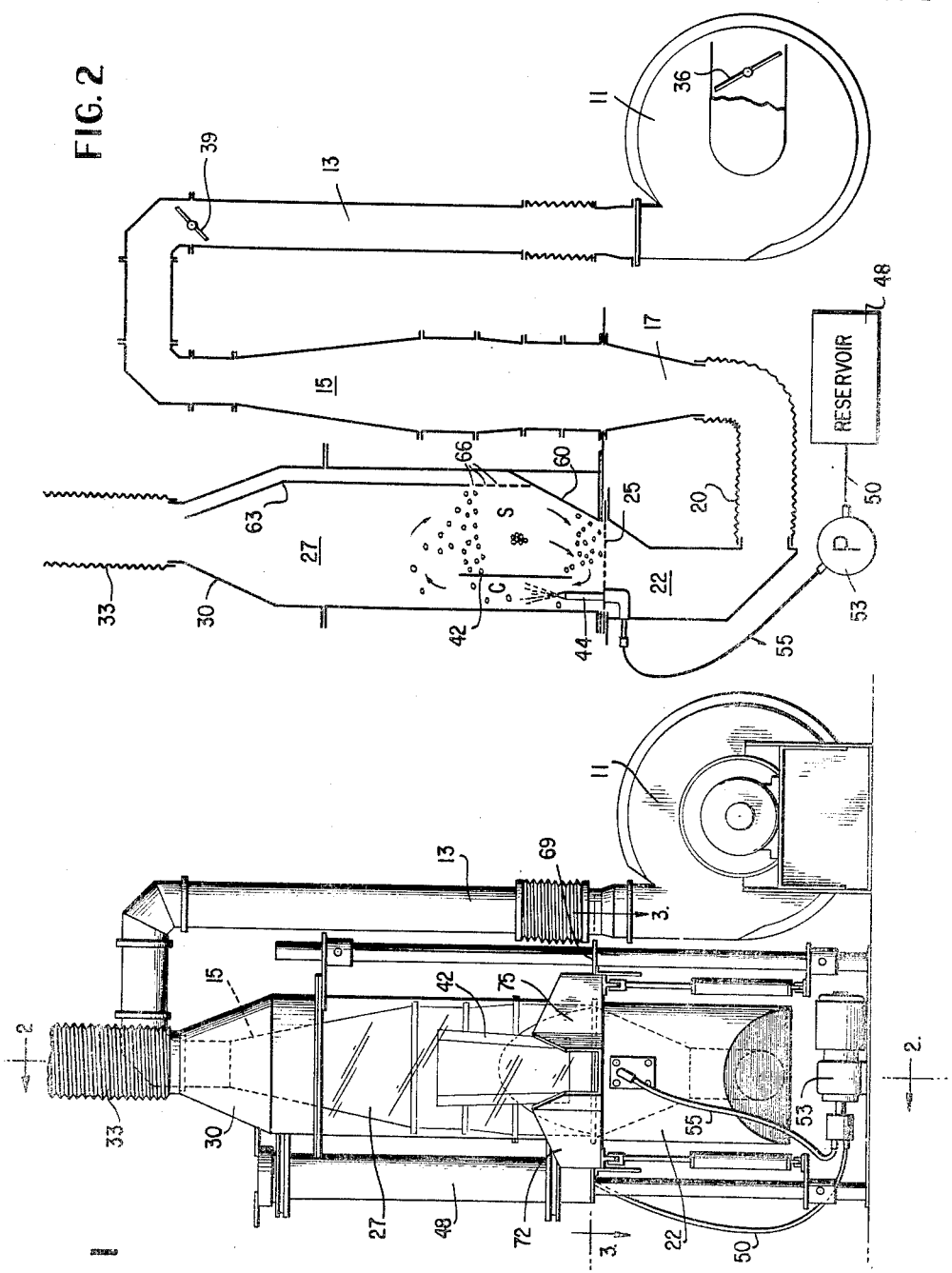

3,196,827
APPARATUS FOR THE ENCAPSULATION OF DISCRETE PARTICLES

Dale E. Wurster, Madison, Wis., and James A. Lindlof, White Bear Lake, Minn., assignors to Wisconsin Alumni Research Foundation, Madison, Wis., a corporation of Wisconsin
Filed Nov. 19, 1962, Ser. No. 238,422
3 Claims. (Cl. 118—24)

This invention concerns a device or apparatus designed for the encapusulation of discrete particles of macro-size, as opposed to micro-particles or powders. Examples of such macro-particles are pharmaceutical tablets, sugar seeds, candy or confectionery items, fertilizer particles, chemical prills, grains and/or seeds, etc. This apparatus may be used for the encapsulation of particles or objects in the size range of from about 30 mesh (U.S. Standard sieve size) to about 3" in diameter.

An object of this invention is to provide for the application of coating materials in such a manner as to provide complete encapsulation of the objects being coated. Another object of the invention is to apply the encapsulation coatings in such a manner as to provide for a substantially uniform thickness of coating on all particles of a batch and on all surfaces of individual particles. A further object of this invention is to provide for the minimization or elimination of attrition, deformation, and/or breakage of the particles during the encapsulation process. A further object of this invention is to provide for the application of said encapsulation coatings in such a manner as to produce a surface finish which will be attractive to prospective purchasers or users of the encapsulated products. A still further object is to provide for the application of the encapsulation coatings in such a manner as to prevent or minimize penetration of the coating solvent into the core of the substrate material.

Encapsulation coatings which may be applied by this device include aqueous solutions such as sugar syrup, gelatine, carboxy-methyl-cellulose, methyl cellulose, and starch paste and organic solutions such as cellulose-acetate-phthalate, ethyl cellulose, zein, polyvinyl acetate, and other similar resins and waxes. Similarly, suspensions, slurries, melts, latexes, and emulsions may be applied as coatings in this device.

Basically, this device consists of an apparatus in which the substrate particles to be encapsulated pass rapidly upward through a zone of finely atomized droplets of coating while they are freely suspended in a fast-moving air stream. The dried coated particles then move downward in a fluidized condition countercurrent to a flow of heated fluidizing gas and subsequently reenter the coating portion of the cycle. The cycle takes place within a single chamber which preferably is provided with a partition for separation of the upwardly and downwardly moving particle streams. The chamber is preferably truncated near its bottom to provide a cross-sectional area at the bottom of the chamber perhaps only 75 to 90% of the cross-sectional area in the main body of the chamber. This truncation provides for an upward velocity of gas in the bottom of the chamber greater than the velocity in the main portion of the chamber and by arranging for the bottom of the descending fluidized bed of particles to be thus constricted, preferably in the region remote from the coating zone, the descending particles are given a further push in the direction of the coating zone. The taper of the truncated portion is normally about 30° from the vertical. The tapered portion may extend upward above the bottom of the coating chamber a distance of from about 2 to 12 inches.

An important feature of this invention is the provision of a screen or porous plate for the bottom of the chamber which has definite areas of varying mesh sizes or porosity. This screen provides for a better control over the circulation of the particles through its variation in mesh sizes than is provided in the apparatus suggested in copending application Serial No. 98,078, filed March 24, 1961, now abandoned. The screen will have a highly porous area for determination of the fast-moving air stream in the coating zone and an area of relatively low porosity for determination of the fluidized zone. Also, the screen will have a third area remote from the highly porous area or coating zone with porosity characteristics greater than the low porosity area and which can be intermediate the other two to ensure the continuance of all particles evenly in the cycle. These screen portions will be referred to hereinafter as areas H, L and M. The porosity of the medium area M will generally be about 1.5 to 3.5 times the porosity of the low porosity area L. The high porosity area H may conveniently have a porosity of 3 to 4 times that of area L. A suitable ratio of the openness of areas H to M to L is about 3.5/2/1; i.e. area H may be about 35% open, while area M is about 20% open and area L is about 10% open. As noted above, the range of porosities of area H and area M overlap and where desired the porosity of area M can be the same as the porosity of area H.

High porosity area H is located under the coating portion of the apparatus. The medium porosity area is located adjacent a wall or the walls of the coating chamber remote from area H. Area L, the area of low porosity, is positioned intermediate the areas H and M, and like area M area L is under the portion of the chamber which comprises the zone of descending fluidized particles.

Based on the area in the main body of the chamber, area H can be about 5–15%, area M about 10–40% and area L about 45–85%. In a preferred arrangement the cross-sectional area at the bottom of the chamber is 85% of the cross-sectional area in the main body of the chamber, i.e. the area of the main body of the chamber is reduced 15% by the truncation (hereinafter referred to as area T). Area T is preferably about the same as area M, except that area M should be at least about 10% of the cross-sectional area of the main body of the chamber. Thus, when the area in the main body of the chamber is reduced 15% by the truncation, area M should be about 15% of the area in the main body of the chamber or about 13% of the area of the screen.

While the chamber can be truncated near its bottom, and in some instances is preferred, as noted above, the chamber need not be truncated, in which case the cross-sectional area throughout the chamber is the same as the cross-sectional area of the porous bottom. Where the chamber is truncated, the truncation should not exceed 25%, as the cross-sectional area of the porous bottom, through which the fluidizing gas passes upwardly, should be at least 75% of the cross-sectional area of the main body of the chamber.

The introduction of three gas streams with controlled velocities into the bottom of the chamber via areas H, L and M, has proven to be a distinct improvement over the use of a single high velocity gas stream, and also to give better control of the cyclic flow of particles in the larger chambers than obtainable with two gas streams, one of high velocity and one of low velocity. The provision of a third gas stream remote from the coating zone with a velocity greater than the low velocity fluidizing gas stream adjacent the coating zone has been found to aid in the smooth flow of the particles, e.g. prevent stoppage of particles with the formation of unfluidized accumulations, and also to aid materially in the transportation of the particles from the bottom of the downwardly flowing fluidized bed where the particles move horizontally above the porous bottom and pass under the partition to the coating zone.

The partition in the coating chamber physically separates the coating zone where the particles move upwardly, from the subsidence zone where the particles move downwardly in a fluidized bed countercurrent to the upwardly flowing gas streams from areas L and M. The partition is generally designed to enclose about 8 to 20% of the cross-sectional area of the coating chamber. It can be so designed as to enclose a constant cross-sectional area, or such as to provide a decrease in area of about 20% from the bottom to the top, or to provide a venturi-type internal space with a reduction of area from the bottom flared inlet to a throat section and then gradual expansion to an exit having area about the same as the inlet area. The partition normally extends from a level about 2 to 4 inches above the porous member to the level desired for the top of the fluidized bed. This level is generally about one to three times the diameter or smallest cross-sectional distance of the coating chamber.

Another partition may be provided for the removal of dust and chips from the substrate material. This partition would enclose a small portion, say about 5%, of the cross-sectional area of coating chamber and would have openings below the top level of the fluidized bed which are somewhat smaller than the particle size of unbroken substrate particles.

The invention will be better understood by reference to the accompanying drawings, which are illustrative only, and in which FIGURE 1 is a front elevation of apparatus according to this invention;

FIGURE 2 is a diagrammatic cross-sectional view of the apparatus, partly along the line 2—2 of FIGURE 1;

FIGURE 3 is a view of the screen as it would be seen along the line 3—3 of FIGURE 1;

FIGURE 4 is a cross-sectional diagrammatic view of a modified form of the coating chamber; and FIGURE 5 is a cross-sectional view along the line 5—5 of FIGURE 4.

Apparatus employing this invention would ordinarily include the blower 11 which supplies fluidizing gas through duct 13 to heat exchanger 15. From there, the heated gas passes through duct 17 and flexible connection 20 to the plenum chamber 22. From plenum chamber 22 the gas passes through distribution plate or screen 25 and into coating chamber 27. From this chamber the exhaust gas passes out through the exhaust hood 30 to exhaust duct 33.

Inlet damper 36 is located at the inlet to blower 11, and outlet damper 39 is located in duct 13, or duct 17. The combination of these two dampers or similar air control devices can control both the volume and pressure of the fluidizing gas delivered to coating chamber 27. With this arrangement of gas control devices, blower 11 may be a centrifugal type blower powered by a constant speed motor. Other types of blowers may be alternately used with a variable speed drive substituted for dampers to control the volume and pressure of gas delivered. Gas volume and gas pressure sensing devices may also be incorporated into the apparatus to indicate the gas volume and pressure, or alternately to automatically control the gas flow and pressure.

Heat exchanger 15 is normally a steam coil type heat exchanger but could alternately have electric heating elements or use other type of heating medium. Normally, the heat exchanger is automatically controlled to deliver gas or air heated to a preset temperature. This can be accomplished by a modulating controller with a sensing element (not shown) located downstream from the heat exchanger in duct 17, flexible connection 20, or plenum chamber 22. Under certain circumstances, the apparatus can be operated without the use of a heating device for the fluidizing gas, but such operation is generally at reduced efficiency.

As shown, the chamber 27 is provided with partition 42 which divides the main body of the chamber into zones C and S. Zone C is generally the same cross-sectional area as is provided by the high porosity area H of the porous member 25. It should be noted that the partition 42 is elevated above the screen 25, allowing passage for particles underneath the partition and over the partition. Atomizing nozzle 44 projects through the screen 25 and is directed toward zone C. This atomizing nozzle 44 is supplied with coating from reservoir 46 by line 50, metering pump 53 and line 55. The use of a metering pump is not essential to the encapsulation process, but does provide better control and hence better quality. Atomization nozzle 44 may be an air atomizing nozzle, either internal mixing or external mixing, or an "airless" type spraying nozzle. In FIGURES 1, 2 and 3 this nozzle 44, and with it, zone C, is located at the side of the coating chamber 27, while in FIGURES 4 and 5 these are in the central portion of the chamber 27. FIGURE 3 shows the hole 57 in the screen 25 through which the nozzle projects.

FIGURES 3 and 5 show in detail representative designs for the porous distribution plate or screen 25 to control the velocity or volume of gas passing up into the various portions of coating chamber 27. Portion L of plate 25 admits relatively low velocity gas to the fluidized bed zone S of coating chamber 27. The openings in portion L provide for only about 10% of open area. Portion H of plate 25 admits high velocity air to spray zone C of coating chamber 27. The openings in area H of plate 25 provide for about 35% open area. Portion M provides excess fluidizing gas at the back or edges of coating chamber 27, by having about 20% open area. This increased gas flow serves to make up for the velocity loss due to the tapered section 60 of the chamber 27 and also serves to keep the particles away from the walls of the coating chamber and in the main circulation stream. Thus area H of the screen is located below coating zone C of the coating chamber, while area L and area M are located below subsidence zone S of the coating chamber. The tapered portion 60, as shown in the drawings, may be located on the side of the coating chamber opposite the nozzle or may be arranged annularly around a central nozzle.

Cleaning partition 63, as shown, is provided with the perforations 66, below the bed level of chamber S for reception of dust, etc. into the flue formed behind the chamber 27 which flue empties into the exhaust duct 33. This flue may be further provided with a clean-out port (not shown) at or near its lower extremity. In operation, the pressure below the top of the fluidized bed in zone S would force some of the fluidizing gas through the openings 66 into the flue space behind partition 63 and would carry dust and undesirable fine particles with it. These would either settle in this flue space to be removed later, or be carried up and out the exhaust.

Further provision can be made for temperature-sensing devices in the upper portion of coating chamber 27, or in exhaust hood 30, or exhaust duct 33, to indicate the temperature and/or degree of saturation of the exhaust gases. Said temperature or saturation level sensing devices can further be used to control either the rate of application of the coating solution or the temperature of the inlet gas, or both, to partially or fully automate the encapsulation process.

Provision may also be made for filters, either at the inlet to the blower or in the exhaust, or both. Provision may also be made for a suitable solvent recovery system in the exhaust gas stream, in which case the gas may or may not be recycled as a closed system.

The apparatus as shown is for batch operation. To facilitate unloading after encapsulation, plenum chamber 22 including plate 25 may be hinged to the back of coating chamber 27 and swung down. Exhaust chamber 33 may be pivoted upwards or sidewards for filling the chamber.

In operation substrate particles are loaded into coating chamber 27 and the apparatus is sealed. The blower forces heated air up through plate 25, and a flow of atomized liquid droplets is started from nozzle 44. A rapid flow of gas up through coating zone C aspirates particles from the bottom of subsidence zone S and carries them rapidly up through the spray of atomized droplets in coating zone C. Droplets impinge on and are also electrostatically attracted to the particles in coating zone C. When the coating fluid is of the proper surface tension, the deposited droplets flow over the surface to form a very thin film which dries within a very short period using mainly the heat available on the surface of the particles. The dried, surface cooled particles issue from the top of coating member C beyond the top of partition 42, and the rapidly moving flow of gas diffuses outward. This outward diffusion of the gas flow lowers its velocity below the transport or support velocity for the particles and allows them to fall or be eased down onto the top of the fluidized bed in subsidence zone S. The lower gas velocity through the fluidized bed is just below or at incipient fluidization velocity and allows the particles to move downward, en masse, in a weightless condition or very near to such a condition. While moving downward in this bed, the particles are traveling countercurrent to the flow of heat gas and hence the surfaces of the particles become heated. Near the bottom of this bed, the tapered portion of the chamber forces a movement of the surface heated particles toward the coating zone, and a flow of aspirating gas through the plate carries these particles on into the coating zone, completing the cycle.

Since this complete cycle is fairly fast, on the order of 10–30 seconds, the core or nucleus of the particles does not usually become substantially heated. The surface of the particles becomes heated sufficiently to dry a very thin film, and the surface cools as the film dries, and then becomes warmed again in the fluidized bed portion. Since the complete encapsulation process requires 10–60 minutes, it can be seen that the final film is composed of about 100 or more very thin layers or increments.

Because the coating apparatus of this invention is so efficient it may be manufactured in a relatively small size, e.g. where the chamber is 6 to 18 inches in diameter. Also, since the elegant coating produced is ideally suited for the preparation of high-value products, the coating chamber may be fabricated from a transparent synthetic resin material, for example, an acrylic resin such as "Lucite." As shown in the drawings, this chamber may be supported on the table 69, which advantageously is also provided with the guard members 70 and 75. The table 69 has a central opening suitable for reception of the porous plate 25 and the plenum chamber is affxed to the bottom of this table.

The apparatus may also be arranged as a plurality of communicating coating chambers and may also be adapted to continuous encapsulation by providing a particle enery at one side of the chamber 27 and an exit at the other side.

It is claimed:

1. An apparatus for the encapsulation of discrete particles comprising a vertically disposed coating chamber, said chamber being divided by partition means into a vertically disposed coating zone and a vertically disposed subsidence zone, said zones being in open communication at their upper ends above said partition means and at their lower ends below said partition means, said chamber having porous closure means located below said partition means whereby gas may be passed into said chamber, said porous closure means being characterized by areas of differing porosity, the porosity of each of said areas being a measure of the amount of each area which is open to the passage of gas therethrough, said areas of differing porosity comprising an area of high porosity located beneath the said coating zone comprising from about 5% to about 15% of the cross sectional area of the coating chamber, an area of medium porosity, comprising from about 10% to about 40% of the cross-sectional area of the coating chamber, located beneath the said subsidence zone and being separated from the said area of high porosity by an area of low porosity comprising the remainder of the cross-sectional area of said porous closure means, the amount of the high porosity area and the medium porosity area open to the flow of gas therethrough being respectively from about 3 to 4 times and from about 1.5 to 3.5 times the amount of the low porosity area open to the flow of gas therethrough, the amount of the medium porosity area open to the flow of gas in no event being greater than the amount of the high porosity area open to the flow of gas, and atomizing means located to direct an atomized encapsulating material into the said coating zone.

2. The apparatus of claim 1 in which the coating chamber is tapered at its lower end to provide a bottom cross-sectional area about 75 to 90% of the cross-sectional area in the upper portion of the chamber.

3. The apparatus of claim 2 in which the area of medium porosity is about equal to the difference in cross-sectional area between the upper portion of the coating chamber and the bottom of the chamber.

References Cited by the Examiner

UNITED STATES PATENTS

| | | | |
|---|---|---|---|
| 2,339,932 | 1/44 | Kuhl. | |
| 2,768,095 | 10/56 | Tadema et al. ______ | 118—303 XR |

RICHARD D. NEVIUS, *Primary Examiner.*